United States Patent
Xu (10) Patent No.: US 10,250,343 B2
(45) Date of Patent: Apr. 2, 2019

(54) TECHNIQUE FOR MEASURING REFERENCE SIGNAL RECEIVED POWER

(71) Applicant: Telefonaktiebolaget LM Ericsson (publ), Stockholm (SE)

(72) Inventor: Bai Cheng Xu, Nuremberg (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 217 days.

(21) Appl. No.: 15/113,910

(22) PCT Filed: Feb. 25, 2014

(86) PCT No.: PCT/EP2014/000493
§ 371 (c)(1),
(2) Date: Jul. 25, 2016

(87) PCT Pub. No.: WO2015/127942
PCT Pub. Date: Sep. 3, 2015

(65) Prior Publication Data
US 2016/0352442 A1    Dec. 1, 2016

(51) Int. Cl.
*H04B 17/318* (2015.01)
*H04B 17/327* (2015.01)
(Continued)

(52) U.S. Cl.
CPC ......... *H04B 17/318* (2015.01); *H04B 17/327* (2015.01); *H04B 17/345* (2015.01);
(Continued)

(58) Field of Classification Search
None
See application file for complete search history.

(56) References Cited

U.S. PATENT DOCUMENTS

| 10,057,839 B2 * | 8/2018 | Ng ........................ H04W 48/16 |
| 2011/0025861 A1 | 2/2011 | Dumm |

(Continued)

FOREIGN PATENT DOCUMENTS

CN            102196486 A       9/2011

OTHER PUBLICATIONS

3rd Generation Partnership Project, "3rd Generation Partnership Project; Technical Specification Group Radio Access Network; Evolved Universal Terrestrial Radio Access (E-UTRA); Physical layer; Measurements (Release 11)", Technical Specification, 3GPP TS 36.214 V11.1.0, Dec. 1, 2012, pp. 1-14, 3GPP, France.
(Continued)

*Primary Examiner* — Derrick W Ferris
*Assistant Examiner* — Manuel Rangel
(74) *Attorney, Agent, or Firm* — Coats & Bennett, PLLC (57) ABSTRACT

A technique for measuring Reference Signal Received Power (RSRP) is provided. The RSRP is measured based on Cell-specific Reference Signals (CRSs) provided by cells (102, 104) of a mobile telecommunications network (100). The CRSs of at least two of the cells overlap in time and frequency. As to a method aspect of the technique, a time offset for sub-frames received from the at least two cells is determined. The overlapping CRSs are received for a group of sub-carriers. A coarse channel state is estimated for each of the at least two cells by multiplying the received overlapping CRSs with a function of phase-shifted CRSs. The phase-shifted CRSs of different sub-carriers in the group include a phase-shift that corresponds to the determined time offset. The RSRP is measured for each of the at least two cells based on the estimated coarse channel state.

18 Claims, 6 Drawing Sheets

(51) Int. Cl.
 H04B 17/345 (2015.01)
 H04L 5/00 (2006.01)
 H04L 25/02 (2006.01)
 H04W 56/00 (2009.01)
(52) U.S. Cl.
 CPC ........ *H04L 5/0048* (2013.01); *H04L 25/0204* (2013.01); *H04W 56/00* (2013.01)

(56) References Cited

U.S. PATENT DOCUMENTS

| | | | | |
|---|---|---|---|---|
| 2013/0231123 A1* | 9/2013 | Yoo | ............... | H04W 56/00 455/450 |
| 2014/0098689 A1* | 4/2014 | Lee | ............... | H04B 7/0469 370/252 |
| 2014/0112253 A1* | 4/2014 | Nagata | ............... | H04L 5/0023 370/328 |
| 2014/0362720 A1* | 12/2014 | Kim | ............... | H04B 7/024 370/252 |
| 2015/0004987 A1* | 1/2015 | Lee | ............... | H04W 72/08 455/450 |
| 2015/0244508 A1* | 8/2015 | Kim | ............... | H04L 5/0023 370/329 |
| 2015/0381388 A1* | 12/2015 | Zirwas | ............... | H04L 5/001 370/330 |
| 2016/0242083 A1* | 8/2016 | Guan | ............... | H04W 24/08 |

OTHER PUBLICATIONS

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Technical Specification, 3GPP TS 36.300 V11.4.0, Dec. 1, 2012, pp. 1-208, 3GPP, France.

3rd Generation Partnership Project, "3rd Generation Partnership Project; Technical Specification Group Radio Access Network; Evolved Universal Terrestrial Radio Access (E-UTRA); Requirements for support of radio resource management (Release 11)", Technical Specification, 3GPP TS 36.133 V11.3.0, Dec. 1, 2012, pp. 1-661, 3GPP, France.

3rd Generation Partnership Project, "3rd Generation Partnership Project; Technical Specification Group Radio Access Network; Evolved Universal Terrestrial Radio Access (E-UTRA); Physical channels and modulation (Release 11)", Technical Specification, 3GPP TS 36.211 V11.5.0, Dec. 1, 2013, pp. 1-120, 3GPP, France.

Alcatel-Lucent Shanghai Bell, et al., "Discussion for CRS Related Functionalities under CRS Collision", 3GPP TSG RAN WG1 Meeting #70, Qingdao, China, Aug. 13, 2012, pp. 1-2, R1-123135, 3GPP.

Intel Corporation, "Discussion on time nad frequency offset impact on CRS-IC for FeICIC", 3GPP TSG RAN WG4 Meeting #66, Malta, Jan. 28, 2013, pp. 1-6, R4-130219, 3GPP.

Nec Group, "On CRS interference handling", 3GPP TSG-RAN WG1#70, QingDao, China, Aug. 13, 2012, pp. 1-8, R1-123244, 3GPP.

Nikia Siemens Networks, et al., "Timing /frequency offset considerations for feICIC CRS-IC", 3GPP TSG-RAN WG4 Meeting #66bis, Chicago, IL, Apr. 15, 2013, pp. 1-4, R4-131730, 3GPP.

* cited by examiner

TECHNIQUE FOR MEASURING REFERENCE SIGNAL RECEIVED POWER

TECHNICAL FIELD

The present disclosure relates to a technique for measuring Reference Signal Received Power (RSRP). More specifically and without limitation, the disclosure relates to a method and a device for measuring the RSRP in case of colliding Cell-specific Reference Signals (CRSs).

BACKGROUND

Mobile devices in communication with a mobile telecommunications network perform a plurality of measurements on the physical layer. For example, User Equipment (UE) for Long Term Evolution (LTE) is required to measure the radio characteristics as specified in document 3GPP TS 36.214 (V11.1.0). The measurements are reported to higher layers and are used for a variety of purposes including intra- and inter-frequency handover, inter-Radio Access Technology (inter-RAT) handover, timing measurements and Radio Research Management (RRM).

Reference Signal Received Power (RSRP) is one of the most basic physical layer measurements performed by the UE. The RSRP is defined in document 3GPP TS 36.214, Sect. 5.1.1, as the linear average in frequency space over the power contributions of those resource elements that carry Cell-specific Reference Signals (CRSs) within the considered measurement frequency bandwidth. The CRSs are specified in document 3GPP TS 36.211 (V11.5.0).

While LTE does not specify the number of resource elements underlying the RSRP measurement according to document 3GPP TS 36.214 (V11.1.0), the RSRP measurement has to meet accuracy requirements. For example, an accuracy requirement in the range of ±6 dB to ±11 dB has to be fulfilled, e.g., depending on noise level and environmental conditions. The difference in RSRP between two cells on different frequencies has to be measured with an accuracy of ±6 dB (which is also referred to inter-frequency measurement). Measuring the difference in RSRP between two cells on the same frequency is a more accurate measurement for which the requirements vary from ±2 dB to ±3 dB (which is also referred to as intra-frequency measurement).

In LTE according to the releases 10 and 11, Heterogeneous Networks (HetNet) are introduced for improving data throughput of the mobile telecommunications network. Due to overlapping areas covered by different cells, the RSRP measurement has to be performed in the presence of strong intra-frequency interference from other cells in case of CRS colliding. The CRS of an interfering cell can be up to 6 dB higher than the CRS of a target cell in release 10 and up to 9 dB higher than the target cell in release 11.

Conventionally, the RSRP is measured by computing a coarse channel estimation based on a de-rotation of the received CRS. The coarse channel estimation is filtered to reduce noise contributions. The RSRP results from the filtered channel estimation after compensating a gain factor of an Automatic Gain Control (AGC) or a gain factor of the downlink chain. However, the measurement accuracy of the conventional RSRP measurement can be degraded by intra-frequency interference so that a 3GPP requirement for the measurement accuracy cannot be fulfilled under all channel conditions or cellular network topologies, e.g., in LTE networks according to release 11.

SUMMARY

Accordingly, there is a need for a technique for measuring received power for different cells in the presence of intra-frequency interference.

According to one aspect, a method of measuring Reference Signal Received Power (RSRP) based on Cell-specific Reference Signals (CRSs) is provided. The CRSs are provided by cells of a mobile telecommunications network, wherein the CRSs of at least two of the cells overlap in time and frequency. The method comprises a step of determining a time offset for sub-frames received from the at least two cells; a step of receiving the overlapping CRSs for a group of sub-carriers; a step of estimating a coarse channel state for each of the at least two cells by multiplying the received overlapping CRSs with a function of phase-shifted CRSs, wherein the phase-shifted CRSs of different sub-carriers in the group include a phase-shift that corresponds to the determined time offset; and a step of measuring the RSRP for each of the interfering cells based on the estimated coarse channel state.

By virtue of the determined time offset between a frame structure received from different cells, a phase-shift can be associated, for each of the at least two cells, to the different sub-carriers for which the overlapping CRSs are received, so that the coarse channel state can be determined by essentially eliminating the mutual interference of the different cells in at least some situation, so that the RSRP can be measured for the different cells. At least some implementations of the technique use the received overlapping CRSs as additional information, as compared to a conventional algorithm considering the overlap as a source of interference. The estimated coarse channel states, and hence the measured RSRP, can be at least substantially interference-free in the same or other implementations of the technique.

For example, a method of measuring RSRP based on CRSs provided by a first cell and a second cell of a mobile telecommunications network is provided. First CRSs provided by the first cell and second CRSs provided by the second cell overlap in time and frequency, e.g., at a mobile device receiving the first CRSs and the second CRSs. The method comprises a step of determining a time offset for sub-frames between the first cell and the second cell; a step of receiving the overlapping CRSs for a group of sub-carriers; a step of estimating a coarse channel state for each of the first cell and the second cell by multiplying the received overlapping CRSs with a function of phase-shifted CRSs. The phase-shifted CRSs may include the first CRSs of the first cell and the second CRSs of the second cell. E.g., the phase-shifted CRSs are representable by a matrix including a first row for the first CRSs on the different sub-carriers in the group and a second row for the second CRSs on the different sub-carriers in the group. The second CRSs in the phase-shifted CRSs include a phase-shift that corresponds to the determined time offset. The method further comprises a step of measuring the RSRP for each of the first cell and the second cell based on the estimated coarse channel state.

The estimation may assume that the channel states for some or all of the different sub-carriers in the group are equal for a given cell. For each of the at least two cells, for example, the same channel state may be assumed for all sub-carriers in the group or for neighboring CRS sub-carriers in the group.

The phase-shifted CRSs may include, for a given cell, phase-shifted CRSs for each of the sub-carriers in the group. The phase-shift may correspond to a frequency-domain representation of the time offset determined for the given cell. The phase may be shifted relative to CRSs as sent by the given cell. The CRSs as sent by the given cell may be known to a UE and/or locally stored, e.g., according to a standard definition.

The function may include an inverse or a pseudoinverse of the phase-shifted CRSs. For example, the inverse or the pseudoinverse may include phase-shifted CRSs for some or each of the at least two cells. The phase-shifted CRSs may be representable by a matrix including a matrix element for each combination of cell among the at least two cells and sub-carrier in the group. The number of sub-carriers in the group may be equal to, or greater than, the number of the at least two cells. The inverse of the phase-shifted CRSs may be computed, if the number of sub-carriers in the group is equal to the number of the at least two cells. Otherwise, the pseudoinverse of the phase-shifted CRSs may be computed.

The coarse channel states may be estimated without filtering noise. For example, the inverse or the pseudoinverse may be computed according to a Zero Forcing (ZF) equalization of the at least two cells. Alternatively or in combination, the inverse or the pseudoinverse can be computed according to Minimum Mean Square Error (MMSE) equalization of the at least two cells. The inverse or the pseudoinverse may be representable by a matrix. The coarse channel states may be computed by multiplying the received overlapping CRSs for the group of sub-carriers (e.g., represented by a vector) with the inverse or the pseudoinverse (e.g., represented by the matrix).

The group may include CRS sub-carriers according to a CRS allocation. The CRS allocation may specify resource elements in time and frequency allocated to the CRSs. The CRS allocation may be specified by document 3GPP TS 36.211 (e.g., V11.5.0), Sect. 6.10.1.

The time offset may be determined based on a Primary Synchronization Signal (PSS) and/or a Secondary Synchronization Signal (SSS). The synchronization signals may be specified according to 3GPP TS 36.211 (e.g., V11.5.0), Sect. 6.11.

A plurality of overlapping CRSs may be received. The plurality of overlapping CRSs may be received for a plurality of groups of sub-carriers in the same OFDM symbol and/or the same sub-frame. Alternatively or in addition, the plurality of overlapping CRSs may be received in different OFDM symbols and/or different sub-frames.

A plurality of coarse channel states may be estimated, e.g., based on some or all of the plurality of received overlapping CRSs. The RSRP measurement may be based on the plurality of coarse channel state estimations. For example, the RSRP measurement may be based only on those coarse channel state estimations, the phase-shifted CRSs of which fulfill a regularity criterion. The regularity criterion may include a determinant |A| of the phase-shifted CRSs A. Alternatively or in addition, the regularity criterion may include a determinant $|A^H A|$ of the matrix product $A^H A$, wherein $A^H$ is the Hermitian matrix of the matrix A.

In one implementation, the RSRP may be computed based on the squares of the absolute values of the coarse channel states estimated for the at least two cells. The computation of the RSRP may further be based on the squares of the absolute values of the plurality of received overlapping CRSs underlying the estimated coarse channel states.

In another implementation, the RSRP may be computed based on the square of the absolute value of an average of two or more of the coarse channel states, e.g., estimated for different OFDM symbols and/or different ones of the at least two cells. The computation of the RSRP may further be based on the squares of the absolute values of each of the two or more of the coarse channel states estimated for different OFDM symbols and/or different ones of the at least two cells.

The implementations may be combined. In each of the implementations, the computation may further yield a noise power. The noise power may characterize radio reception from each of the at least two cells. An accuracy of the coarse channel state estimation and/or the RSRP measurement may be increased by increasing the number of sub-carriers in the group and/or by increasing the number of overlapping CRSs underlying the coarse channel state estimations.

The at least two cells may include neighboring cells, e.g., with overlapping coverage areas. Alternatively or in combination, the at least two cells may include at least one of a macrocell, a microcell and a picocell of the mobile telecommunications network. The coverage area of at least one of the at least two cells may be inside the coverage area of another one of the at least two cells. The method may be performed by a User Equipment (UE) of the mobile telecommunications network. The at least two cells may include at least one of a cell serving the UE, a target cell of the UE (e.g. for a potential handover) and an interfering cell for the UE.

As to a software aspect, a computer program product comprising program code portions for performing any one of the steps of above-mentioned methods is provided. The steps may be performed when the computer program product is executed on one or more computing devices. The computer program product may be provided on a computer-readable recording medium. Alternatively or in combination, the computer program product may be provided for download in a data network, e.g., the Internet and/or the mobile telecommunications network.

As to a hardware aspect, a device for measuring Reference Signal Received Power (RSRP) based on Cell-specific Reference Signals (CRSs) is provided. The CRSs are provided by cells of a mobile telecommunications network, wherein the CRSs of at least two of the cells overlap in time and frequency. The device comprises a determining unit adapted to determine a time offset for sub-frames received from the at least two cells; a receiving unit adapted to receive the overlapping CRSs for a group of sub-carriers; an estimating unit adapted to estimate a coarse channel state for each of the at least two cells by multiplying the received overlapping CRSs with a function of phase-shifted CRSs, wherein the phase-shifted CRSs of different sub-carriers in the group include a phase-shift that corresponds to the determined time offset; and a measuring unit adapted to measure the RSRP for each of the at least two cells based on the estimated coarse channel state.

BRIEF DESCRIPTION OF THE DRAWINGS

In the following, the technique is described in more detail with reference to exemplary embodiments thereof illustrated in the drawings, wherein FIG. 1 schematically illustrates a first example for a mobile telecommunications system including a mobile device receiving overlapping reference signals.

DETAILED DESCRIPTION

In the following description, for purposes of explanation and not limitation, specific details are set forth, such as specific device and system configurations and specific methods, steps and functions, in order to provide a thorough understanding of the technique presented herein. It will be appreciated that the technique may be practiced in other embodiments that depart from these specific details. While wireless interfaces and network components described herein are consistent with the Global System for Mobile Communications (GSM), the Universal Mobile Telecommunications System (UMTS) and/or 3GPP Long Term Evolution (LTE), the technique is also applicable in networks using any other wireless access technology (e.g., W-LAN according to IEEE 802.11 standards) or wired access technology (e.g., copper cables running in parallel and experiencing crosstalk).

Those skilled in the art will further appreciate that the methods, steps and functions described herein may be implemented using individual hardware circuitry, using software functioning in conjunction with a programmed microprocessor or a general purpose computer, using one or more Application Specific Integrated Circuits (ASICs), one or more Digital Signal Processors (DSPs) and/or one or more Field Programmable Gate Arrays (FPGAs). It will also be appreciated that the technique disclosed herein may be embodied in a processor and a memory coupled to the processor, wherein the memory stores one or more programs that perform the methods, steps and functions described herein when executed by the processor.

Figure 1:
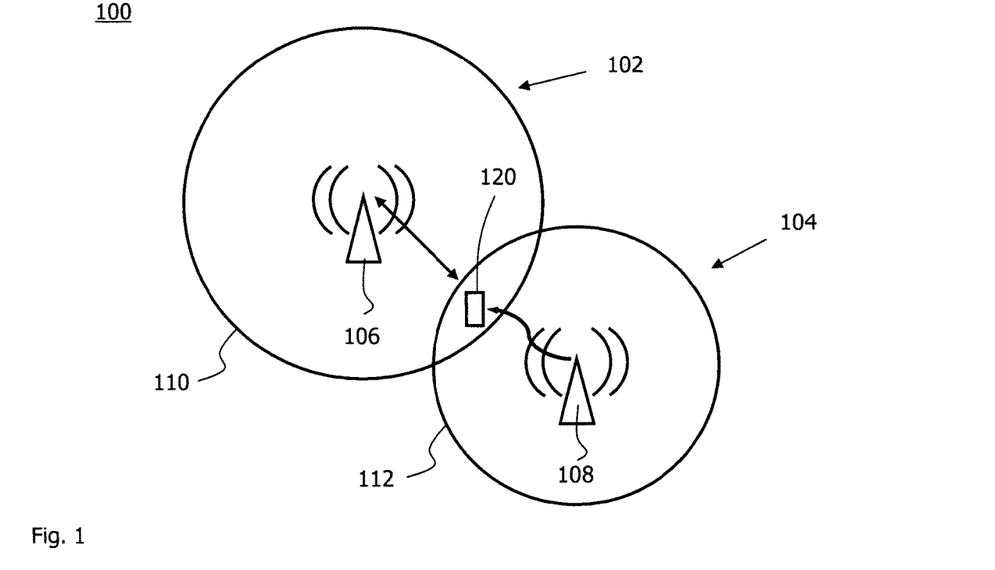

FIG. 1 schematically illustrates a mobile telecommunications system 100 including a first cell 102 and a second cell 104. Each of the cells 102 and 104 includes a base station 106 and 108, respectively, which covers a cell area 110 and 112, respectively. The cell areas 110 and 112 overlap. E.g., to service an increasing number of mobile devices wirelessly connected to a mobile telecommunications network, the density of cells 102 and 104 (e.g., macrocells operating at a transmission power of 60 W) is increased.

The base stations 106 and 108 use an (at least substantially) equal carrier frequency for providing a downlink channel to a mobile device 120. The cells 102 and 104 are also referred to as intra-frequency cells.

In the exemplary situation illustrated in FIG. 1, the mobile device 120 is connected to the first cell 102 (which is also referred to as a serving cell). When the mobile device 120 moves out of the cell area 110 towards the cell area 112, a handover from the first cell 102 to the second cell 104 (which is also referred to as a target cell) is evaluated or performed. The handover is performed, e.g., depending on received power of reference signals provided by each of the cells 102 and 104. However, intra-frequency interference caused by the reference signals sent by the first cell 102 degrades the accuracy of the RSRP measurement performed by the mobile device 120 for the second cell 104.

If the mobile device 120 remains within the cell area 110 of the first cell 102, so that a handover is not planned, or if a handover is technically not possible, the mobile device 120 measures Reference Signal Received Power (RSRP) for the first cell 102, e.g., for computing a path loss based on which an optimum power setting for operation the base station 106 is determined. However, intra-frequency interference caused by the reference signals sent by the second cell 104 (also referred to as interfering cell) degrades the accuracy of the RSRP measurement performed by the mobile device 120 for the first cell 102.

Figure 2:
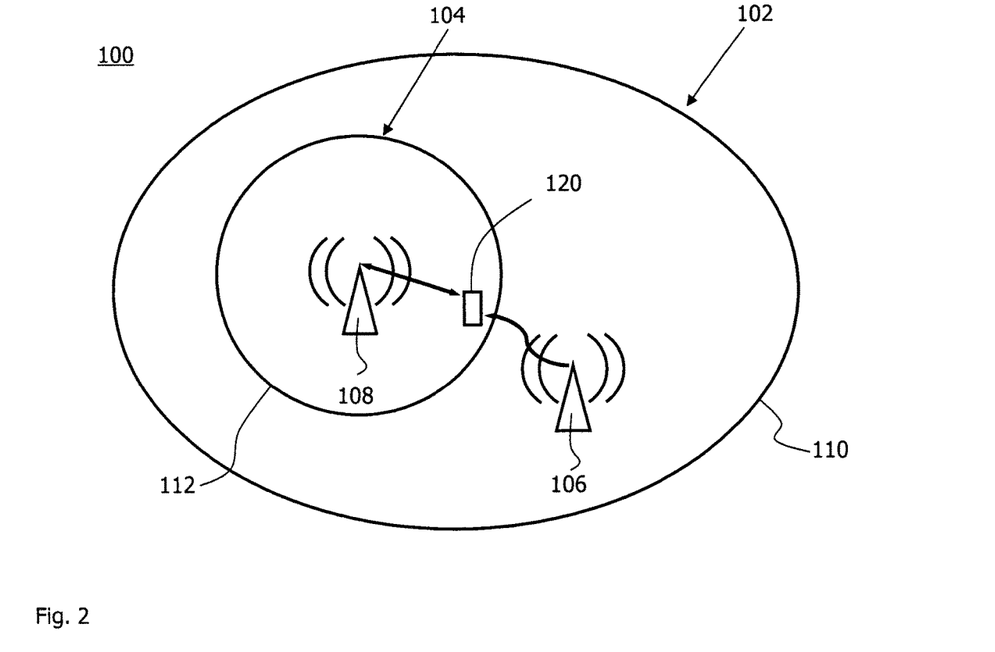
FIG. 2 schematically illustrates a second example for a mobile telecommunications system including a mobile device receiving overlapping reference signals.

Furthermore, to achieve high network capacity and/or seamless network coverage, existing cells, e.g., macrocells, of a mobile telecommunications system 100 are complemented by smaller cells, e.g., a microcell operating as a transmission power of 10 W to 20 W, or a picocell operating at a transmission power of 2 W to 5 W. The telecommunications network 100 schematically illustrated in FIG. 2 includes a macrocell 102 and a picocell 104. From the perspective of a mobile device 120 wirelessly connected to the telecommunications network 100, the picocell 104 is the serving cell and the macrocell 102 is a target cell or an interfering cell. The telecommunications network 100 of FIG. 2 is an example for a Heterogeneous Network (HetNet).

Figure 3:
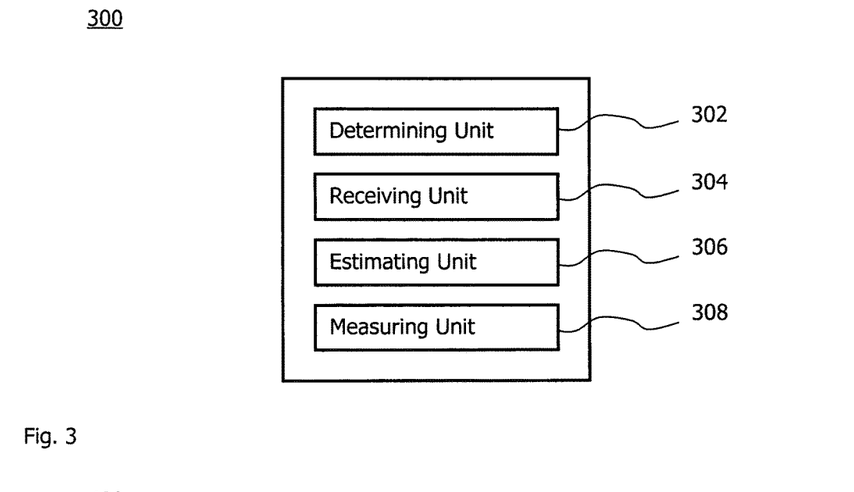
FIG. 3 illustrates a schematic block diagram of device for measuring Reference Signal Received Power (RSRP) based on the reference signals received by the mobile device of FIG. 1 or 2.

FIG. 3 schematically illustrates a block diagram of a device 300 for measuring Reference Signal Received Power (RSRP). The reference signals to be measured are Cell-specific Reference Signals (CRSs) provided by different cells of a mobile telecommunications network. The CRSs of at least two different cells overlap in time and frequency.

The device 300 includes a determining unit 302 performing cell synchronization. The determining unit 302 processes a Primary Synchronization Signal (PSS) and a Secondary Synchronization Signal for frame synchronization. A location of the PSS depends on a duplex mode, e.g., a Frequency Division Duplex (FDD) mode or a Time Division Duplex (TDD) mode. More specifically, for FDD, the PSS is located in the last Orthogonal Frequency-Division Multiplexing (OFDM) symbol of a first time slot of a first sub-frame of a radio frame. Based on the PSS and the SSS, the timing of the frame structure received from the cells 102 and 104 is known on a sub-frame level. Furthermore, a Physical Cell Identifier (PCI) is determined based on a combination of the PSS and the SSS. The PCI determines locations of the CRSs within the frame structure.

The device 300 further includes a receiving unit 304 for receiving CRSs from the cells 102 and 104. Optionally in conjunction with a de-rotation stage or by replacing a conventional de-rotation stage of the device 300, an estimating unit 306 estimates an at least substantially interference-free channel state by de-multiplexing the overlapping CRSs. The device 300 further includes a measuring unit 308 providing the RSRP for at least one of the intra-frequency cells 102 and 104.

Figure 4:
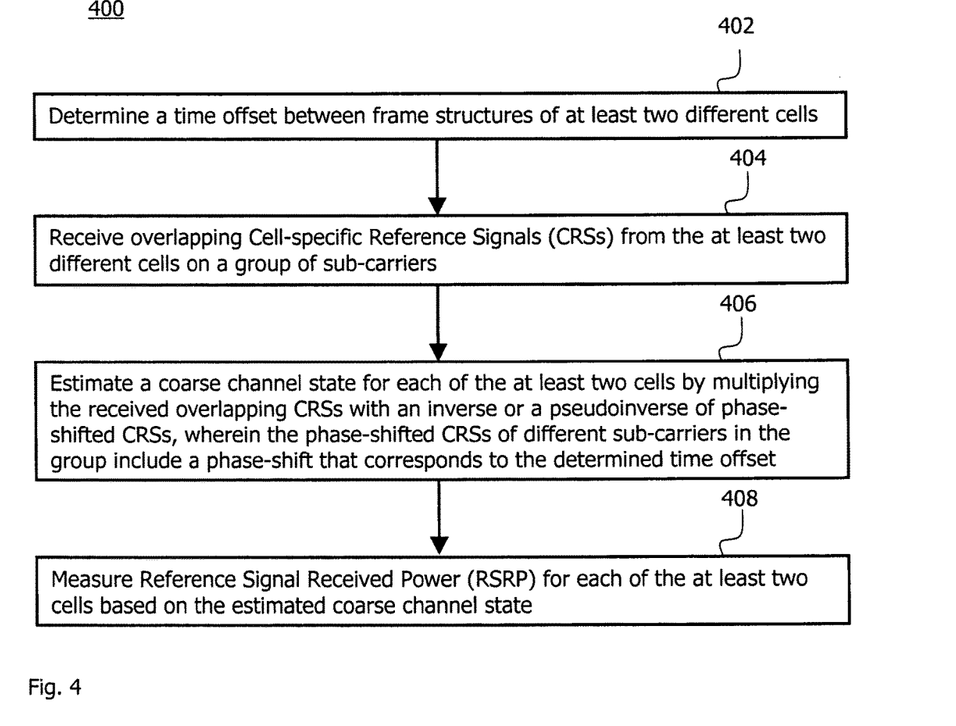
FIG. 4 shows a flowchart for a method of measuring RSRP based on the reference signals received by the mobile device of FIG. 1 or 2.

FIG. 4 shows a flowchart of a method 400 of measuring Reference Signal Received Power (RSRP) based on Cell-specific Reference Signals (CRSs) provided by cells of a mobile telecommunications network. The method 400 can be performed by the device 300, e.g., in the mobile telecommunications network 100 shown in FIG. 1 or 2. The device 300 and the method 400 can be implemented in the mobile device 120.

A time offset between frame structures of at least two different cells is determined in a step 402. CRSs are received from the at least two different cells on a group of sub-carriers in a step 404. The CRSs of the different cells partially overlap in time and frequency. For example, the frame structures of the different cells are synchronized on a sub-frame level and/or the different cells use the same carrier frequency. E.g., the frame structures used by the different cells deviate by less than 1 ms. An accuracy for the time offset determined in the step 402 is on the level of a fraction of a sub-frame, e.g., in the range from 0 μs to 100 μs, or from 10 μs to 100 μs (e.g., about 66.7 μs).

In a step 406 of the method 400, a coarse channel state is estimated for each of the at least two cells by multiplying the received overlapping CRSs with an inverse or a pseudoinverse of phase-shifted CRSs. The phase-shifted CRSs include a phase-shift that corresponds to the time offset determined for the cell, the CRSs of which are shifted in phase. The phase-shift depends linearly on a frequency of the sub-carriers in the group. The linear dependency is determined by the corresponding time offset.

The RSRP is measured for each of the at least two cells based on the estimated coarse channel state in a step 408. A noise component is removed from the square of an absolute value of the estimated coarse channel state. The RSRP is computed based on a square of an absolute value of the estimated channel state after removing the noise component. The computation further takes a gain factor of an Automatic Gain Control (AGC) or a gain factor of the downlink chain into account.

The steps 402 to 408 of the method 400 can be performed by the units 302 to 308, respectively.

Figure 5:
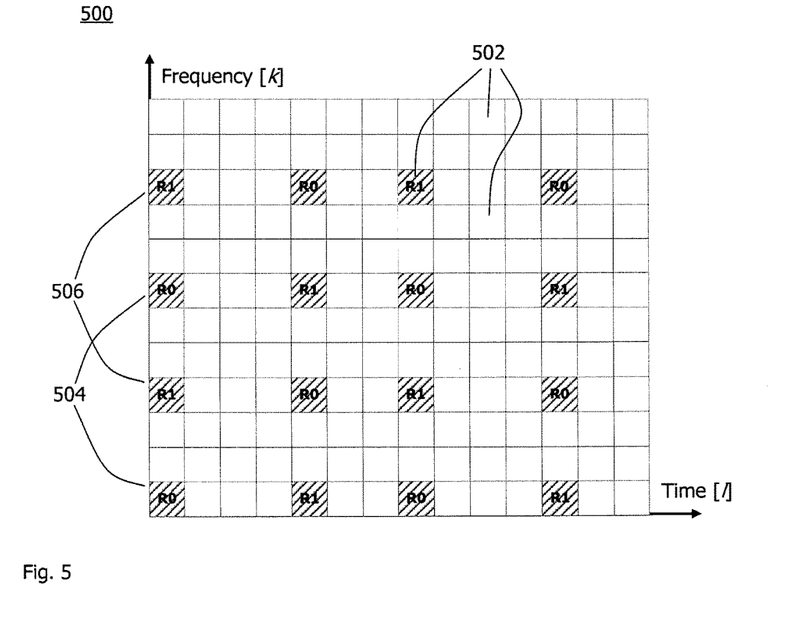
FIG. 5 schematically illustrates an allocation of resource elements in frequency and time to the reference signals received by the device of FIG. 3 according to the method of FIG. 4.

FIG. 5 schematically illustrates a mapping or allocation 500 of resource elements 502, e.g., transmission resources for the downlink channel of the telecommunications network 100 to the mobile device 120, as a function of time and frequency. Time is allocated in units of time slots having 0.5 ms duration. Two time slots define one sub-frame. In Frequency Division Duplex (FDD) modes, one radio frame comprises 10 sub-frames. For a normal cyclic prefix, each sub-frame comprises 14 OFDM symbols. For an extended cyclic prefix, each sub-frame comprises 12 OFDM symbols.

FIG. 5 schematically illustrates the allocation 500 of the resource elements 502 to CRSs, R0 and R1, within one resource block. The resource block includes one sub-frame in the time dimension (shown on the horizontal axis in FIG. 5) and 12 sub-carriers in the frequency dimension (shown on the vertical axes in FIG. 5). Each resource element 502 in the resource block 500 is illustrated by a box. Each of the resource elements 502 is uniquely addressed by a combination of one OFDM symbol (illustrated as a column of boxes in FIG. 5) and one sub-carrier (corresponding to a row of boxes in FIG. 5).

Standard document 3GPP TS 36.211 (e.g., V11.5.0) specifies which resource elements 502 are allocated to CRSs. For the normal cyclic prefix and one antenna port being used by the base stations 106 and/or 108, the CRS R0 is provided on a first group of sub-carriers 504. When the base stations 106 and/or 108 use two or more antenna ports, the CRS R1 is additionally provided on a second group of sub-carriers 506. While the resource block includes 14 OFDM symbols in the case of the normal cyclic prefix, similar resource block mappings are specified in Sect. 6.10.1.2 of document 3GPP TS 36.211 (e.g., V11.5.0) for the case of the extended cyclic prefix in resource blocks including 12 OFDM symbols.

Using indices (l, k) for the resource elements 502 allocated to CRSs, the CRSs received according to the step 404 can be represented by $$r_{l,k}=h_{l,k}s_{l,k}+n_{l,k}, k\in K, l\in L, \quad (1)$$

wherein $h_{l,k}$ is the channel state for the resource element on the $l^{th}$ CRS symbol and the $k^{th}$ CRS sub-carrier. The CRS as transmitted by any one of the base stations 102 and 108 on the CRS resource element (l, k) is $s_{l,k}$. L is the index set of OFDM symbols including CRSs, and K is the index set of the group of CRS sub-carriers, e.g., 504 and/or 506.

The last term in Equation (1) represents noise. In Equation (1), the interference from other cells is seen as part of the noise term, $n_{l,k}$.

When the mobile device 120 is outside of the overlap between the cell areas 110 and 112, a coarse channel state is estimated by de-rotation according to $$\hat{h}_{l,k}=r_{l,k}s_{l,k}^*=h_{l,k}+n_{l,k}s_{l,k}^*, \quad (2)$$

wherein the asterisk denotes complex conjugation. Since the OFDM components s are normalized to an absolute value equal to one, multiplication by the complex conjugate causes the de-rotation. The coarse channel estimate is then filtered resulting in an estimation for the channel state $h_{l,k}$. Based on the square of the absolute value of the filtered channel state and a gain factor of the AGC, the RSRP is computed.

However, when the CRS interference is (e.g., for LTE release 10) 6 dB or (e.g., for LTE release 11) 9 dB higher than the CRS of the cell for which the RSRP is to be measured, the required accuracy of the RSRP measurement cannot be achieved. Therefore, the device 300 performs the method 400 at least in the overlap of the cell areas 110 and 112 of the intra-frequency cells 102 and 104.

While the technique has been exemplified for two intra-frequency cells, the device 300 and the method 400 are also applicable in telecommunications network 100 including three or more cells that provide CRSs overlapping in time and frequency at least in some coverage areas.

An implementation of the estimating unit 306 performing the step 406 for N intra-frequency cells with colliding CRSs is explained. Herein, =2, 3, 4, 5 . . . .

The estimating step 406 comprises the substep of defining the phase-shifted CRSs according to the matrix A; the substep of computing the inverse or the pseudoinverse, W, of the matrix A; and the substep of multiplying the inverse or the pseudoinverse, W, with the received overlapping CRSs, R.

Assuming that the channel states of the N intra-frequency cells are constant for M neighboring CRSs, wherein M≥N, the overlapping CRSs received on the M sub-carriers in the group (e.g., the group 504 or 506) can be represented by:

$$r_{k_j+m,l} = \sum_{i=0}^{N-1} e^{-\frac{j2\pi 6(k_j+m)\Delta_i}{128}} c_{k_j+m,l}^{(i)} h_{j,l}^{(i)} + n_{k_j+m,l} \quad (3)$$

The technical meaning of symbols and indices used for explaining exemplary implementations of the technique is summarized in below table.

| Symbol | Description |
| --- | --- |
| $r_{k_j+m,l}$ | Received CRS on symbol l, and $(k_j + m)^{th}$ CRS RE. $l \in L$, $k_j + m \in K$ |
| $\Delta_i$ | Time offset of $i^{th}$ cell, $i \in [0, N-1]$ |
| $c_{k_j+m,l}^{(i)}$ | Transmitted CRS on $l^{th}$ symbol and $(k_j + m)^{th}$ CRS RE from $i^{th}$ cell |
| $h_{j,l}^{(i)}$ | Channel state of $j^{th}$ CRS group with M neighbouring CRS for $i^{th}$ cell $i \in [0, N-1]$ |
| $n_{k_j+m,l}$ | Noise item on symbol l, and $(k_j + m)^{th}$ CRS RE |
| $k_j$ | First CRS index of $j^{th}$ CRS group with M neighbouring CRS |
| j | Group index of M neighbouring CRS |
| m | CRS index within the group of M neighbouring CRS, $m \in [0, M-1]$ |
| i | Cell index, $i \in [0, N-1]$ |
| l | CRS symbol index |

Equation (3) can equally be written using vectors and a matrix:

$$\begin{bmatrix} r_{k_j,l} \\ \vdots \\ r_{k_j+M-1,l} \end{bmatrix} = \begin{bmatrix} e^{-\frac{j2\pi 6k_j \Delta_0}{128}} c_{k_j,l}^{(0)} & \cdots & e^{-\frac{j2\pi 6k_j \Delta_{N-1}}{128}} c_{k_j,l}^{(N-1)} \\ \vdots & \ddots & \vdots \\ e^{-\frac{j2\pi 6(k_j+m)\Delta_0}{128}} c_{k_j+m,l}^{(0)} & \cdots & e^{-\frac{j2\pi 6(k_j+m)\Delta_{N-1}}{128}} c_{k_j+m,l}^{(N-1)} \end{bmatrix} \begin{bmatrix} h_{j,l}^{(0)} \\ \vdots \\ h_{j,l}^{(N-1)} \end{bmatrix} + \begin{bmatrix} n_{k_j,l} \\ \vdots \\ n_{k_j+M-1,l} \end{bmatrix}. \quad (4)$$

That is, $$R = AH + N, \quad (5)$$

wherein the vectors R, H and N are defined by $$R = \begin{bmatrix} r_{k_j,l} \\ \vdots \\ r_{k_j+M-1,l} \end{bmatrix}, H = \begin{bmatrix} h_{j,l}^{(0)} \\ \vdots \\ h_{j,l}^{(N-1)} \end{bmatrix}, N = \begin{bmatrix} n_{k_j,l} \\ \vdots \\ n_{k_j+M-1,l} \end{bmatrix},$$

and the matrix A is defined by $$A = \begin{bmatrix} e^{-\frac{j2\pi 6k_j \Delta_0}{128}} c_{k_j,l}^{(0)} & \cdots & e^{-\frac{j2\pi 6k_j \Delta_{N-1}}{128}} c_{k_j,l}^{(N-1)} \\ \vdots & \ddots & \vdots \\ e^{-\frac{j2\pi 6(k_j+m)\Delta_0}{128}} c_{k_j+M-1,l}^{(0)} & \cdots & e^{-\frac{j2\pi 6(k_j+m)\Delta_{N-1}}{128}} c_{k_j+M-1,l}^{(N-1)} \end{bmatrix}.$$

If A is invertible, H can be estimated by $$\begin{bmatrix} \hat{h}_{j,l}^{(0)} \\ \vdots \\ \hat{h}_{j,l}^{(N-1)} \end{bmatrix} = \hat{H} = WR, \quad (6)$$

wherein $W = \begin{cases} A^{-1}, & \text{if } M = N \\ (A^H A)^{-1} A^H, & \text{if } M > N \end{cases}$ wherein, $\hat{h}_{j,l}^{(0)}, \hat{h}_{j,l}^{(1)}, \ldots, \hat{h}_{j,l}^{(N-1)}$ is the coarse estimation of the channel state $h_{j,l}^{(i)}$.

The upper line on the right-hand side of Equation (6) uses the inverse of the matrix A. The lower line on the right-hand side of Equation (6) uses the pseudoinverse of the matrix A. The estimation 406 according to Equation (6) is also referred to as Zero Forcing (ZF) de-multiplexing. The coarse channel state estimated by means of Equation (6) includes a noise component. In an advanced implementation of the estimation 406, Equation (6) is modified by including the noise power $\sigma^2$ of the noise represented by the last term in each of the Equations (1) and (3) to (5). The advanced implementation of the estimation 406 is also referred to as Minimum Mean Square Error (MMSE) de-multiplexing.

The coarse channel state estimated according to the step 406 is almost interference free. Herein, "almost" means that in case the wireless channel includes significant delay spread, the channel state of neighboring M CRSs is not constant, so that some interference remains in the channel state estimated for other cells. W is the matrix of weights for channel estimation computation. The weights are optionally provided by the step 406.

Optionally, the substep of computing the inverse or the pseudoinverse (and all subsequent steps) is subject to fulfillment of a regularity criterion. For example, a determinant is computed prior to the computation of the inverse or the pseudoinverse. The regularity criterion is fulfilled, if the determinant exceeds a predetermined threshold, e.g., according to $$\begin{cases} |A| > T, & \text{if } M = N \\ |A^H A| > T, & \text{if } M > N \end{cases}, \quad (7)$$

wherein T is the predetermined threshold for the determinant. Otherwise, the group j of overlapping CRSs received on the group of the sub-carriers $k_j$ to $k_j+m$ (e.g., 502 and/or 504) is skipped.

Exemplary implementations 600 of the estimation 406 and the RSRP measurement 408 (and corresponding units 306 and 308, respectively) are described with reference to FIGS. 6 and 7. Based on the received CRSs, which input is indicated at the left hand-side of the block diagram of the implementations 600, the estimating unit 306 provides at least the coarse channel estimation to the RSRP measuring unit 308.

Figure 6:
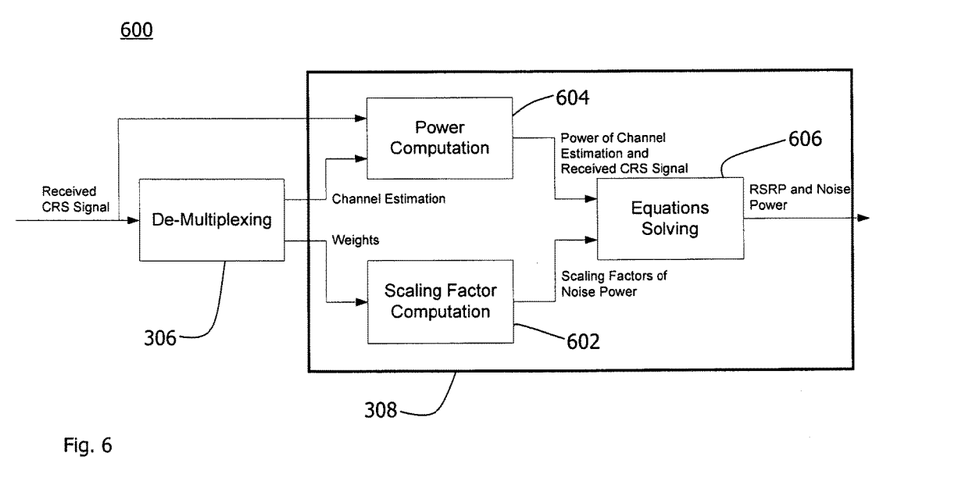
FIG. 6 schematically illustrates a block diagram of a first implementation of an estimating unit and a measuring unit included in the device of FIG. 3.
Figure 7:
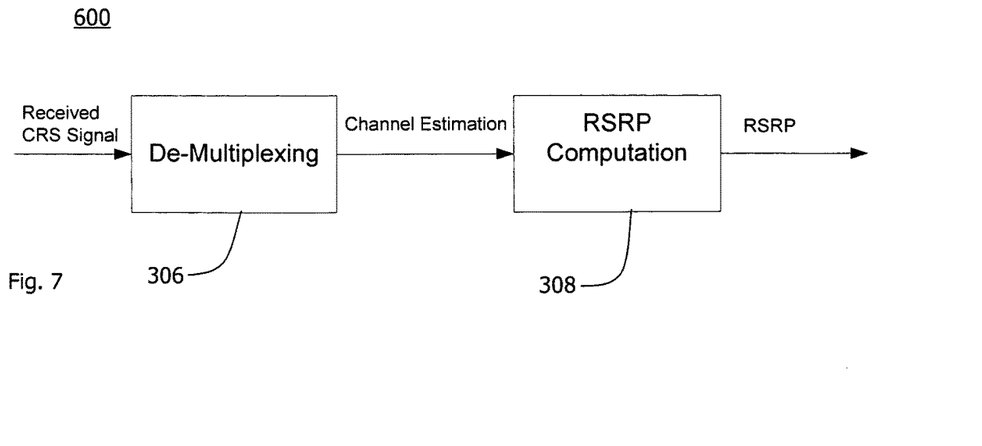
FIG. 7 schematically illustrates a block diagram of a second implementation of an estimating unit and a measuring unit included in the device of FIG. 3.

In a first implementation 600 shown in FIG. 6, the estimating unit 306 further provides the inverse or the pseudoinverse, W, to the RSRP measuring unit 308. In any one of the implementations 600 shown in FIGS. 6 and 7, the estimating unit 306 can implement the ZF de-multiplexing according to Equation (6) or the MMSE de-multiplexing.

In the first implementation 600 shown in FIG. 6, the RSRP measuring unit 308 includes a scaling factor computation subunit 602 for decomposing, for each of the at least two cells 102 and 104, the power of the estimated coarse channel state in a sum of power of noise-compensated channel state and noise power.

The RSRP measuring unit 308 further includes a power computation subunit 604 for computing the squares of the absolute values of the coarse channel states provided by the estimating unit 306 for the at least two cells 102 and 104. The power computation subunit 604 further computes the squares of the absolute values of the plurality of received overlapping CRSs underlying the estimated coarse channel states. The power computation subunit 604 provides the power of the N coarse channel states estimated for the N intra-frequency cells and the total power of the received CRSs.

There are N+1 linear relations between the power of the N estimated coarse channel states and the total power of the received CRSs on the one hand, and the power of the N noise-free channel states for the N intra-frequency cells and the noise power on the other hand. The coefficients for these linear relations are provided by the scaling factor computation subunit 602. Consequently, an equations solving subunit 606 solves the N+1 linear relations yielding the power of the noise-free channel states for the N cells and the noise power.

More specifically, the scaling factor computation subunit 602 computes scaling factors, $\bar{g}^{(i)}$, for the linear relations according to $$\bar{g}^{(i)} = \frac{1}{\sum_{l \in L} |J_l|} \sum_{l \in L} \sum_{j \in J_l} \sum_{m=0}^{M-1} |w_{i,m}^{(j)}|^2. \quad (8)$$

In Equation (8), $J_l$ is the index set of the groups j of CRS sub-carriers in the CRS symbol l, and $|J_l|$ denotes the number of groups in the CRS symbol l. Optionally, the index set $J_l$ is restricted to those groups of CRS sub-carriers, which fulfill the regularity criterion.

An inverse gain factor that compensates, e.g., an Automatic Gain Control (AGC) setting for the $l^{th}$ CRS symbol is denoted by $\beta_l$. Expectation values for the squares of the absolute values of the coarse channel states (i.e., the power of the coarse channel states) can be represented using the scaling factors according to Equation (8):

$$E\left[\beta_l |\hat{h}_{j,l}^{(i)}|^2\right] = \frac{1}{\sum_{l \in L} |J_l|} \sum_{l \in L} \sum_{j \in J_l} \beta_l |\hat{h}_{j,l}^{(i)}|^2 \quad (9)$$

$$= |h^{(i)}|^2 + \frac{\sigma^2}{\sum_{l \in L} |J_l|} \sum_{l \in L} \sum_{j \in J_l} \sum_{m=0}^{M-1} |w_{i,m}^{(j)}|^2$$

$$\xrightarrow{\text{Equation (8)}}$$

$$E\left[\beta_l |\hat{h}_{j,l}^{(i)}|^2\right] = |h^{(i)}|^2 + \bar{g}^{(i)} \sigma^2$$

In Equation (9), $|h^{(i)}|^2$ is the RSRP of the $i^{th}$ cell, wherein $i \in [0, N-1]$, and $\bar{g}^{(i)}$ is the scaling factor of the noise power in the channel state estimation of the $i^{th}$ cell. The noise power is $\sigma^2$, that is $$E[\beta_l |n_{k_j+m,l}|^2] = \sigma^2.$$

The inverse gain factor $\beta_l$ accounts for signal gain from an antenna connection to the device 300 (e.g., to the estimating unit 306 and/or a baseband chip therefor). There are several stages from the antenna connection to the device 300 for changing signal power. Such stages include one or more of the AGC, a Low Pass Filter (LPF) and a Fast Fourier Transformation (FFT). A gain factor $g_{total}$ from the antenna connection to device 300 is $g_{total} = g_{AGC} \cdot g_{LPF} \cdot g_{FFT} \cdot \ldots$ To get the signal power on the antenna convection, the gain factor is compensated, that is, $P_{antenna} = P_{BB}/g_{total}$, wherein the inverse gain factor is $\beta_l = 1/g_{total}$.

The sum of the squares of the absolute values of the received overlapping CRSs (i.e., the power of the received overlapping CRSs) is $$E[\beta_l |r_{k,l}|^2] = \frac{1}{|K||L|} \sum_{k \in K} \sum_{l \in L} \beta_l |r_{k,l}|^2 = \sum_{i=0}^{N-1} |h^{(i)}|^2 + \sigma^2. \quad (10)$$

|K| is the number of elements in the index set K. |L| is the number of elements in the index set L.

Based on the N Equations (9) and the Equation (10), there are N+1 linear relations for N+1 unknown variables, namely $|h^{(i)}|^2, i=0,1, \ldots, N-1$ and $\sigma^2$.

The N+1 variables follow from resolving the $$N+1 \text{ Equations,} \begin{cases} |\hat{h}^{(0)}|^2 = |h^{(0)}|^2 + \bar{g}^{(0)} \sigma^2 \\ |\hat{h}^{(1)}|^2 = |h^{(1)}|^2 + \bar{g}^{(1)} \sigma^2 \\ \vdots \\ |\hat{h}^{(N-1)}|^2 = |h^{(N-1)}|^2 + \bar{g}^{(N-1)} \sigma^2 \end{cases} \quad (9)$$

$$|\hat{r}|^2 = \sum_{i=0}^{N-1} |h^{(i)}|^2 + \sigma^2 \quad (10)$$

wherein $$|\hat{h}^{(i)}|^2 = \frac{1}{\sum_{l \in L} |J_l|} \sum_{l \in L} \sum_{j \in J_l} \beta_l |\hat{h}_{j,l}^{(i)}|^2, |\hat{r}|^2 = \frac{1}{|K||L|} \sum_{k \in K} \sum_{l \in L} \beta_l |r_{k,l}|^2,$$

and $$\bar{g}^{(i)} = \frac{1}{\sum_{l \in L} |J_l|} \sum_{l \in L} \sum_{j \in J_l} \sum_{m=0}^{M-1} |w_{i,m}^{(j)}|^2:$$

$$\begin{bmatrix} |h^{(0)}|^2 \\ |h^{(1)}|^2 \\ \vdots \\ |h^{(N-1)}|^2 \\ \sigma^2 \end{bmatrix} = \left( \begin{bmatrix} 1 & 0 & \ldots & 0 & \bar{g}^{(0)} \\ 0 & 1 & & 0 & \bar{g}^{(1)} \\ \vdots & & \ddots & & \vdots \\ 0 & 0 & \ldots & 1 & \bar{g}^{(N-1)} \\ 1 & 1 & & 1 & 1 \end{bmatrix} \right)^{-1} \begin{bmatrix} |\hat{h}^{(0)}|^2 \\ |\hat{h}^{(1)}|^2 \\ \vdots \\ |\hat{h}^{(N-1)}|^2 \\ |\hat{r}|^2 \end{bmatrix}. \quad (11)$$

The RSRP of each of the N cells, $|h^{(i)}|^2$, and, optionally in addition, the noise power, $\sigma^2$, are computed based on the squares of the absolute values of the coarse channel states estimated for the N cells, $|\hat{h}^{(i)}|^2$, and the sum of the squares of the absolute values of the plurality of received overlapping CRSs underlying the estimated coarse channel states, $|\hat{r}|^2$. The matrix on the right-hand side of Equation (11) does not have to be inverted on runtime. The coefficients of the matrix on the right-hand side of Equation (11) can be encoded as a function of the weights W.

The structure of RSRP computation according to the first implementation 600 is shown in FIG. 6. E.g., Equation (13) is encoded in hardware and/or software for implementing the subunit 606. Summing over $l \in L$ is optional, i.e., the technique may be implemented for $|L|=1$. Increasing $|L|$ can increase the accuracy of the RSRP measurement.

A second implementation of the measuring unit 308 performing the step 408 is schematically illustrated in FIG.

7. The RSRP of each of the N cells is computed based on the square of the absolute value of a sum of two estimated coarse channel states, $|\hat{h}_1^{(i)}+\hat{h}_2^{(i)}|^2$, out of the number $\Sigma_{j \in L}|J_j|$ of estimated coarse channel states $\hat{h}_{j,l}^{(i)}$ provided by the estimating unit 306 and the squares of the absolute values of the two estimated coarse channel states, $|\hat{h}_1^{(i)}|$ and $|\hat{h}_2^{(i)}|^2$.

For example, the measuring unit 308 performs the following steps (A) to (D) for any selection of two estimated coarse channel states, $\hat{h}_1^{(i)}$ and $\hat{h}_2^{(i)}$:

(A) The power of the two coarse channel estimations is computed according to $$|\hat{h}_1^{(i)}|^2 = |h_1^{(i)}|^2 + \sigma^2 \text{ and } |\hat{h}_2^{(i)}|^2 = |h_2^{(i)}|^2 + \sigma^2.$$

(B) An averaged coarse channel estimation of the two estimated coarse channel states is computed according to $$\bar{h} = \frac{\hat{h}_1^{(i)} + \hat{h}_2^{(i)}}{2},$$

and the power of the averaged channel estimation is computed according to $$|\bar{h}|^2 = |h|^2 + \frac{\sigma^2}{2}.$$

(C) An estimation for the noise power is computed according to $$\sigma^2 = 2(|\hat{h}|^2 - |\bar{h}|^2).$$

(D) The RSRP is computed according to $$|h|^2 = |\hat{h}|^2 - \sigma^2. \quad (12)$$

The measurement accuracy achievable by implementations of the technique has been assessed by means of stochastic channel simulations. Results for the first implementation and the second implementation are shown in FIGS. 8 to 11 at reference signs 802 and 804, respectively.

For LTE, the measurement accuracy is defined in document 3GPP TS 36.133 (e.g., V11.7.0) to be within ±6 dB with 90% probability. The measurement error includes contributions from Radio Frequency (RF) and Base Band (BB). After partitioning between RF and BB, the RSRP measurement may contribute up to ±2.5 dB with 90%.

The simulations show that at least some embodiments of the technique satisfy the requirement very well, e.g., even if the Signal-to-Interference Ratio (SIR) is about −12 dB. Below table summarizes configurations for the simulations.

| 2 cells (including 1 macrocell) | Cell ID | [0, 12] |
| | SIR | −12 dB |
| | Time offset | [0, −3] samples based on 1.92 MHz sampling rate |
| 3 cells (including 2 macrocells) | Cell ID | [0, 12, 18] |
| | SIR | −12 dB power, or 2 macrocells are equally 9 dB higher than the power of a target cell |
| | Time offset | [0, −1, −3] samples based on 1.92 MHz sampling rate |
| Common Parameters | SNR | 100 dB/0 dB |
| | Frequency Offset | 1000 Hz |
| | Channel | Additive White Gaussian Noise (AWGN) |
| | Number of sub-frames for the estimation 406 | 4 |

Figure 8:
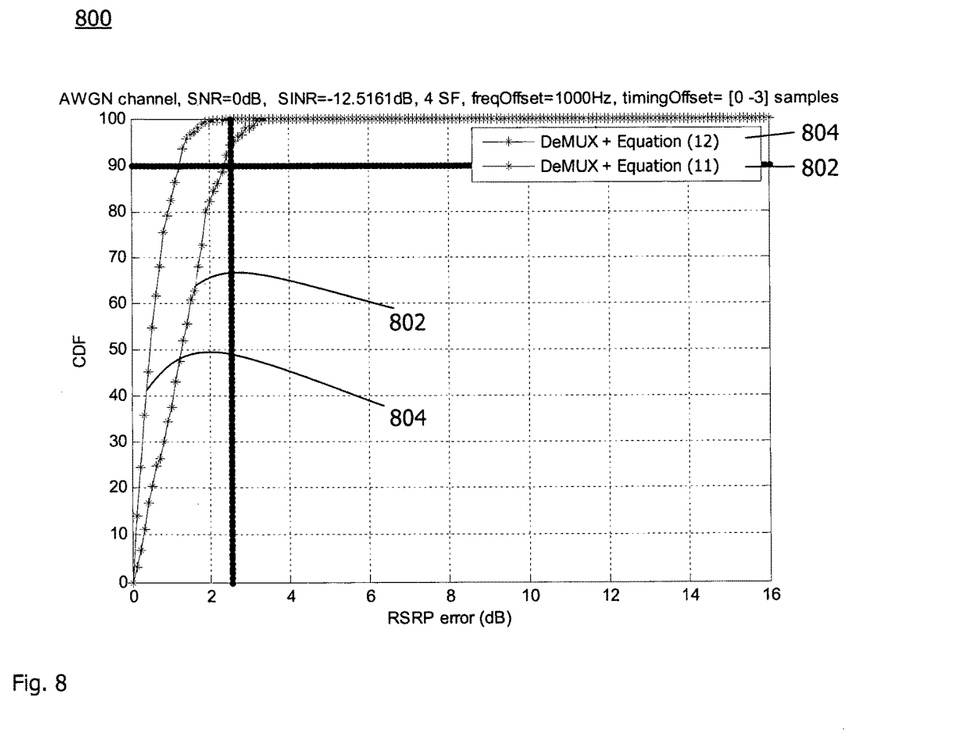
FIGS. 8 to 11 show diagrams for a probability distribution of an error magnitude in an RSRP measurement.
Figure 9:
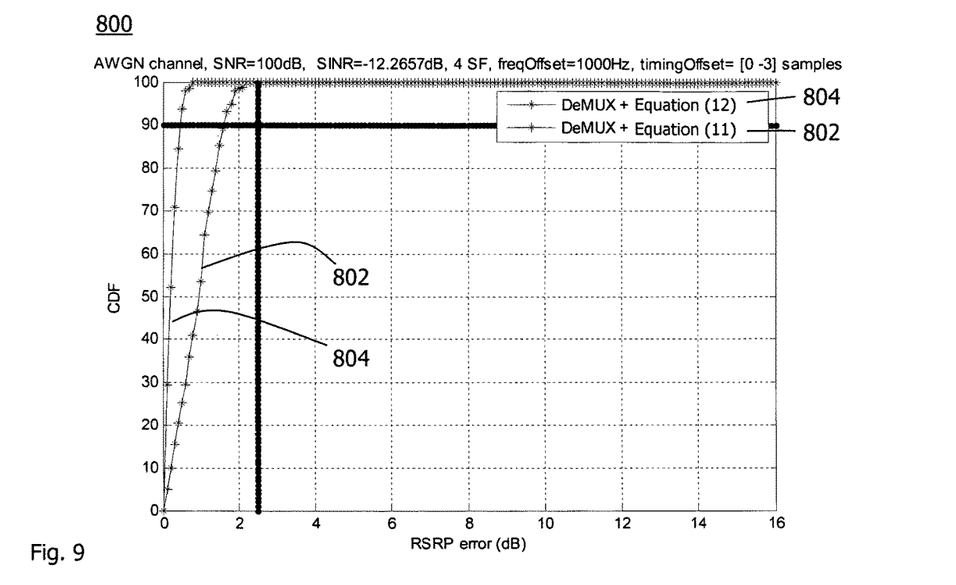
Figure 10:
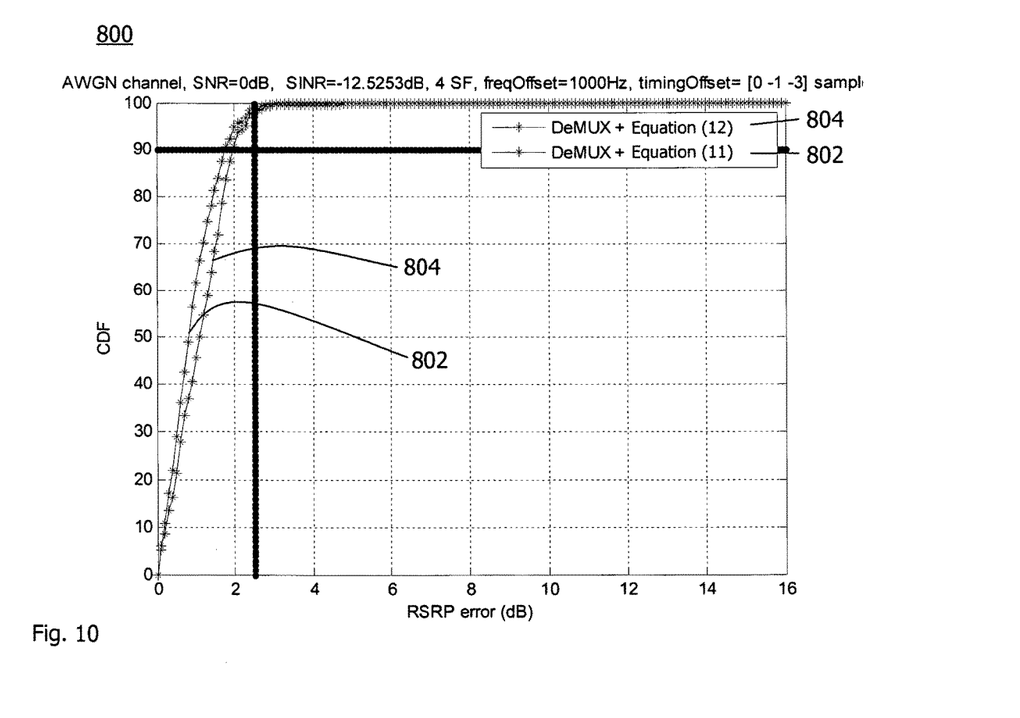
Figure 11:
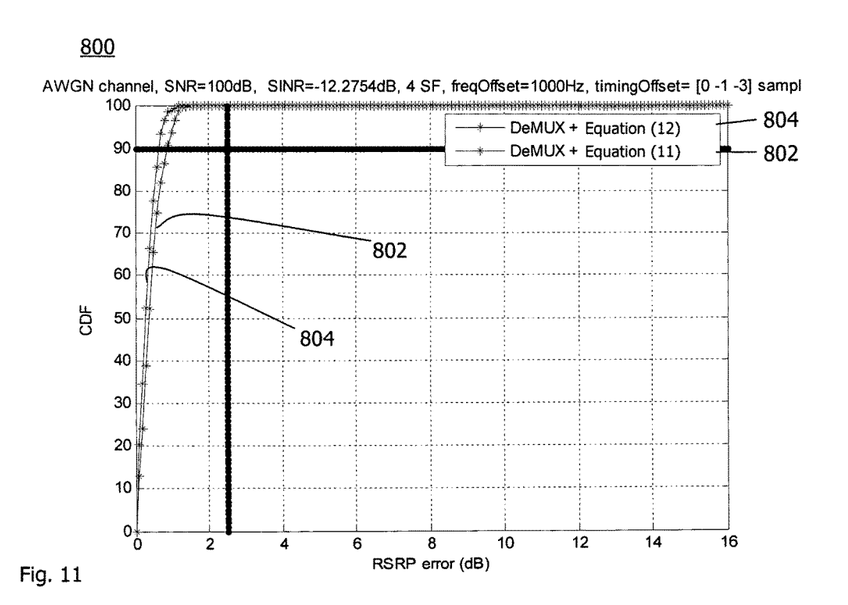

In each of the diagrams of FIGS. 8 to 11, a magnitude of a measurement error is plotted on the horizontal axis and the cumulative probability for errors occurring up to the indicated magnitude is plotted on the vertical axis in percent. FIG. 8 shows the RSRP measurement accuracy for 2 cells with SNR=0 dB for a weak cell. FIG. 9 shows RSRP measurement accuracy for 2 cells with SNR=100 dB for a weak cell. FIG. 10 shows RSRP measurement accuracy for 3 cells with SNR=0 dB for a weak cell. FIG. 11 shows RSRP measurement accuracy for 3 cells with SNR 100 dB for a weak cell.

As has become apparent, exemplary embodiments of the technique can improve the RSRP measurement accuracy in the presence of strong intra-frequency interference from other cells with colliding CRSs. Same or other embodiments allow significantly improving network performance as to data throughput rates and/or subscriber density, e.g., in heterogeneous networks. At least some embodiments of the technique presented herein can resolve the RSRP accuracy issue completely in case of strong intra-frequency interference from other cells with colliding CRSs.

In the foregoing, principles, preferred embodiments and various modes of implementing the technique disclosed herein have exemplarily have been described. However, the present invention should not be construed as being limited to the particular principles, embodiments and modes discussed above. Rather, it will be appreciated that variations and modifications may be made by a person skilled in the art without departing from the scope of the present invention as defined in the following claims.

The invention claimed is:

1. A method of measuring Reference Signal Received Power (RSRP) based on Cell-specific Reference Signals (CRSs) provided by cells of a mobile telecommunications network, wherein the CRSs of at least two of the cells overlap in time and frequency, the method comprising:
    determining a time offset for sub-frames received from the at least two cells;
    receiving the overlapping CRSs for a group of sub-carriers;
    estimating a coarse channel state for each of the at least two cells by multiplying the received overlapping CRSs with a function of phase-shifted CRSs, wherein the phase-shifted CRSs of different sub-carriers in the group include a phase-shift that corresponds to the determined time offset; and
    measuring the RSRP for each of the at least two cells based on the estimated coarse channel state.

2. The method of claim 1, wherein the estimating assumes, for each of the at least two cells, the same channel state for the different sub-carriers in the group.

3. The method of claim 1, wherein the function is an inverse or a pseudoinverse of the phase-shifted CRSs.

4. The method of claim 1, wherein the phase-shifted CRSs include, for each of the at least two cells, phase-shifted CRSs for each of the sub-carriers in the group that are phase-shifted relative to CRSs as sent by the corresponding one of the at least two cells.

5. The method of claim 1, wherein the phase-shifted CRSs are representable by a matrix including a matrix element for each combination of cell (i) among the at least two cells and sub-carrier (k) in the group.

6. The method of claim 1, wherein a number of sub-carriers in the group is equal to or greater than a number of the at least two cells.

7. The method of claim 1, wherein the group includes sub-carriers according to a CRS allocation.

8. The method of claim 1, wherein the time offset is determined based on a Primary Synchronization Signal (PSS) and a Secondary Synchronization Signal (SSS).

9. The method of claim 1, wherein a plurality of overlapping CRSs are received for a plurality of groups of sub-carriers in the same sub-frame and/or a plurality of overlapping CRSs are received for different sub-frames.

10. The method of claim 9, wherein the RSRP measurement is based on a plurality of coarse channel state estimations for at least some of the plurality of received overlapping CRSs.

11. The method of claim 10, wherein the RSRP measurement is based only on those coarse channel state estimations, the phase-shifted CRSs of which fulfill a threshold.

12. The method of claim 10, wherein the RSRP is measured based on the squares of the absolute values of the coarse channel states estimated for the at least two cells and the squares of the absolute values of the plurality of received overlapping CRSs underlying the estimated coarse channel states.

13. The method of claim 10, wherein the RSRP is measured based on the square of the absolute value of an average of two or more of the estimated coarse channel states and the squares of the absolute values of the two or more estimated coarse channel states.

14. The method of claim 1, wherein the at least two cells include at least one of a macrocell, a microcell, and a picocell of the mobile telecommunications network.

15. The method of claim 1, wherein the at least two cells are synchronized on a sub-frame level, and the determined time offset is a time offset between synchronized subframes of a first cell and a second cell.

16. The method of claim 15, wherein the at least two cells use the same carrier frequency.

17. A computer program product stored in a non-transitory computer readable medium for measuring Reference Signal Received Power (RSRP) based on Cell-specific Reference Signals (CRSs) provided by cells of a mobile telecommunications network, wherein the CRSs of at least two of the cells overlap in time and frequency, the computer program product comprising software instructions which, when run one or more processors of a computer system, causes the computer system to:
- determine a time offset for sub-frames received from the at least two cells;
- receive the overlapping CRSs for a group of sub-carriers;
- estimate a coarse channel state for each of the at least two cells by multiplying the received overlapping CRSs with a function of phase-shifted CRSs, wherein the phase-shifted CRSs of different sub-carriers in the group include a phase-shift that corresponds to the determined time offset; and
- measure the RSRP for each of the at least two cells based on the estimated coarse channel state.

18. A device for measuring Reference Signal Received Power (RSRP) based on Cell-specific Reference Signals (CRSs) provided by cells of a mobile telecommunications network, wherein the CRSs of at least two of the cells overlap in time and frequency, the device comprising:
- a processor;
- memory containing instructions executable by the processor whereby the device is operative to:
  - determine a time offset for sub-frames received from the at least two cells;
  - receive the overlapping CRSs for a group of sub-carriers;
  - estimate a coarse channel state for each of the at least two cells by multiplying the received overlapping CRSs with a function of phase-shifted CRSs, wherein the phase-shifted CRSs of different sub-carriers in the group include a phase-shift that corresponds to the determined time offset; and
  - measure the RSRP for each of the at least two cells based on the estimated coarse channel state.

* * * * *